United States Patent [19]

Randolph et al.

[11] Patent Number: 4,520,073

[45] Date of Patent: May 28, 1985

[54] PRESSURE COATING OF MINERAL FILLERS

[75] Inventors: Donald A. Randolph; Kenneth R. Watkins, both of Wheaton, Ill.

[73] Assignee: USG Corporation, Chicago, Ill.

[21] Appl. No.: 565,197

[22] Filed: Dec. 23, 1983

[51] Int. Cl.³ .................... B05D 3/02; B05D 3/04; B05D 7/00
[52] U.S. Cl. .................... 428/405; 427/221; 427/370; 427/377; 427/387; 428/407; 252/378 P
[58] Field of Search ............. 427/215, 221, 370, 377, 427/387; 428/405, 407; 252/378 P

[56] References Cited

U.S. PATENT DOCUMENTS 4,183,980  1/1980  Nielsen .................. 252/378 P
4,255,489  3/1981  Nielsen .................. 252/378 P

*Primary Examiner*—Michael R. Lusignan
*Attorney, Agent, or Firm*—Robert H. Robinson; Samuel Kurlandksy; Kenneth E. Roberts

[57] ABSTRACT

Mineral filler materials are provided with improved hydrophobic coatings by pressure coating of porous minerals using steam as a carrier for the coating material. Thereby more complete sealing of fissures and cracks in the porous filler materials' surface is provided, resulting in very water-resistant coated particles useful in filling polymeric substrates such as paints, plastics and joint compounds.

14 Claims, No Drawings

PRESSURE COATING OF MINERAL FILLERS

BACKGROUND OF THE INVENTION

1. Field of the Invention

This invention relates to the production of coated porous mineral fillers, and more particularly, to a method of pressure impregnating hydrophobic coatings onto porous mineral fillers.

Minerals are utilized as fillers and extenders in compounding polymeric compositions. For example, porous mineral fillers such as calcium carbonate, calcium sulfate, expanded perlite or vermiculite, talc, mica and the like are being used in polymeric composites in increasing portions to obtain superior properties as well as to decrease cost of production by using less polymeric material in the filler-polymer matrix.

Some of these filler materials have limited utility however due to their porous nature, their surface being a fine network of cracks and fissures, and/or due to their water solubility. Most are prepared by comminuting an appropriate ore or rock to a particular grade of particle sizes as by crushing and/or grinding and then classifying with high speed air separators. This causes considerable cracking and fissuring of the particle's surface. Some filler materials are roasted or calcined before, during, or after the comminuting step which introduces further stressing of the particle's surface. Others, notably vermiculite and perlite are subsequently heated to their softening temperature range, expanded or exfoliated by internal gas pressure, and are then reclassified. The reclassification step frequently crushes a portion of the exfoliated structure and allows channeling access to otherwise enclosed voids within the structure. Thus, for example, an expanded perlite may contain many cracks and fissures communicating with otherwise sealed interior air filled cavities. When used in polymeric latex compositions, such as a paint or ready-mixed joint compound, it is desirable that the filler maintain water resistance for long periods of time e.g. up to two years. Any pinhole perforations or fissures into the interior air-filled cavities of the perlite particles will lead to gradual water penetration, causing the perlite to lose its desirable characteristic as a lightweight filler well before the paint or joint compound is to be used, and which may lead to early separation of the latex emulsion.

Other filler materials have limited utility due to gradual water solubility. Fillers having significant water solubilities of about 0.04% or greater, such as calcium carbonate, wollastonite, calcium sulfate anhydrite and gypsum dihydrate, frequently allow capillary channels to form in the polymeric composite after exposure to moisture. For example, calcium sulfate, as the deadburned anhydrite form, only very gradually gives up the last vestige of its water of crystallization and appears to regain it readily upon a few weeks or months storage. This makes some deadburned anhydrites unsuitable for compounding in uses where any residual moisture causes problems. Further, the general water solubility of calcium sulfate anhydrite at room temperature restricts its use in other polymer substrate compounding applications.

2. Description of the Prior Art

It is known in the filler art to apply certain coatings via solution or dispersion onto mineral fillers by soaking the filler in a vat of coating liquid followed by draining and drying the coated filler; and also by pouring or spraying the coating liquid onto a tumbling bed of filler followed by drying and curing. For example, U.S. Pat. No. 3,769,065 discloses a method for coating expanded perlite wherein the material is sprayed first with an acid solution, next with a water glass solution followed by another acid solution, and finally dried and heat cured. U.S. Pat. No. 4,255,489 discloses coating and then heat curing expanded perlite with polysiloxane. U.S. Pat. No. 4,141,751 discloses spraying a silane or titanate coupling agent onto extremely fine inorganic particles undergoing frictional, shearing pressure agitation to generate curing heat in a high intensity mixer. U.S. Pat. No. 2,714,578 discloses obtaining controlled reduced permeability in the interior pores of coarse porous material such as sintered ceramic material, metal powder, or sandstone by first evacuation then elevated temperature and pressure injection of molten paraffin wax or low melting point metal alloys in the production of controlled diffusion barriers for use in a diffusion cell.

SUMMARY OF THE INVENTION

The essence of the present invention is the production of highly water resistant, particulate, mineral filler materials whereby a more complete sealing of the particle's surface with a hydrophobic coating material is achieved. The coating process is carried out by impregnation of the filler in a stirred autoclave under elevated temperature and pressure, using steam as a carrier for getting the hydrophobic coating material into the surface fissures of the filler. Hydrophobic coating materials such as wax-like alkane paraffins, low molecular weight polyalkynes, low molecular weight polyalkylene glycols, long chain aliphatic fatty acids and their water soluble salts, and siloxane emulsions may be used at autoclave temperatures between about 32° C. and 275° C. and steam pressures between about 10 and 100 psig for about 1–30 minutes. The method of the invention is particularly useful in treating porous mineral fillers such as the finest grades (or smallest particle sizes) of expanded perlite and calcium sulfate anhydrite.

DESCRIPTION OF THE PREFERRED EMBODIMENTS

In one highly preferred embodiment, a very finely ground, porous mineral filler (such as expanded perlite or calcium sulfate anhydrite having mean particle sizes of less than 10 micrometers) and a hydrophobic coating material (such as stearic acid or aqueous dimethylpolysiloxane dispersion) are charged to an autoclave and and mixed under gentle agitation, such as a stirrer rotating at 5–30 revolutions per minute and elevated temperature and pressure for at least one minute so as to steam distill the hydrophobic coating material into the surface of the filler. The coating penetrates into and seals off pinhole channels, fissures and cracks when applied at about 0.01 to about 5% by weight of the filler. After drying the coated filler to obtain a highly water resistant product, the coated filler may be immersed in water for extensive periods of time without any appreciable loss of its lightweight and water resistant characteristics.

Suitable autoclave apparatus for use in the present invention includes any pressure vessel, equipped with a gentle agitation, low shear-head, stirrer, and capable of providing a temperature between about 32° C. and about 275° C. and saturated steam pressures between about 10 psig and 100 psig.

Suitable porous mineral fillers to be treated in accordance with the present invention include any finely divided inorganic mineral compound suitable for use in filling or extending polymeric compositions and/or having a porous surface or numerous cracks, fissures, crevices or channels in its surface. Suitable fillers for treatment may be from any natural ore or rock source such as vermiculite or perlite ore, calcium carbonate or calcium sulfate anhydrite rock; or synthesized from chemical processes such as those producing precipitated calcium carbonate or calcium sulfate in the soluble anhydrite, gypsum or anhydrite II forms, including either particulate, orthorhombic crystalline, acicular crystalline or fibrous configurations. Particularly suitable materials include the finer grades of expanded perlite, vermiculite and the calcium sulfate compounds. Perlite is particularly suitable for the present treatment since the expanding of finer ore particles and subsequent reclassification results in considerable fracturing of the exfoliated structure evidenced by substantial loss of lightweight character upon sustained contact with water. The calcium sulfate compounds in various form and crystalline structure configurations are particularly suitable for the present treatment because of their water solubilities.

Any hydrophobic coating material that is a fluid under the recommended elevated temperature and steam pressure sufficient to flow into the surface crevices of gently agitated inorganic minerals is suitable for use in the practice of the present method. The coating material may be introduced in any aqueous or organic solvent, solution, dispersion, or low melting point solid form, although low melting point (then fluid at about 32°–275° C. and 10–100 psig) solid and aqueous solution or dispersion forms are generally preferred because of concern over fire and toxic vapor hazards. Suitable hydrophobic coating materials include, but are not limited to, long chain aliphatic fatty acids and dicarboxylic fatty acids and their salts having from about 12 to about 24 carbon atoms, such as stearic acid or calcium stearate, or other water dispersible ammonium, metallic or organic base salts of, for example, lauric, oleic, or palmitic acids. Low melting temperature, waxy-like members of the alkane paraffin series and/or low molecular weight polyalkylenes, including alkanes having from about 2 to 60 carbon atoms (such as tetradecane, nonadecane and hexacontane) and polyethylene or polypropylene condensates having a molecular weight from about 280 to 30,000 may be used. Polyethylene glycols having a molecular weight from about 700 through about 6000, particularly methoxy or ethoxy polyethylene glycols such as those available from Union Carbide under the trademark CARBOWAX may be used. Various silicones may be used including organo-functional silicones having the general formula $R-SiX_3$ wherein R is selected from the group consisting of alkoxy and acetoxy, such as acrylate, methacrylate, glycidoxy, epoxy, propoxy, epoxy cyclohexyl, and vinyl and X is selected from the group consisting of halogen, alkoxy and acetoxy. Film-forming aqueous or organic solvent solutions, emulsions or dispersions may be used. Mercapto, amido, azido and epoxy silicones which cure to water imiscible films are also suitable. Particularly preferred silicones are aqueous polydimethyl siloxane emulsions, including those commercially available from Dow Chemical Company under the designation Dow 347 and from General Electric Company under the designation G.E. SM-2138 siloxane dispersion.

The concentration of active hydrophobic coating material in solution, emulsion or dispersion form in the practice of the present method may vary widely. Generally, those amounts which will provide on a dry weight basis from about 0.01 to about 5% hydrophobic solids materials based on the weight of the mineral filler may be used. The present method is particularly amenable to providing coatings of greater thickness and increased amounts of hydrophobic coating material (such as 1–2% by weight) on the filler, compared to prior art coating methods. It also provides increased water resistance and increased penetration, filling and sealing of interstices in the surface of the filler.

After coating and sealing interstices in the filler, the wet coated filler is discharged from the autoclave and dried and/or further cured for times and temperatures appropriate to the particular filler and hydrophobic coating. Generally, oven drying for 10 minutes to 48 hours at about 27° C.–320° C. may be employed.

The following specific examples will further illustrate various specific embodiments of the present invention. All amounts are expressed as parts by weight unless specified to the contrary. Of course, it is to be understood that these examples are by way of illustration only and are not to be construed as limitations on the present invention.

EXAMPLE 1

For a first series of evaluations, a fine grade of expanded perlite for potential use as a filler in a paint type of polymeric formulation was obtained. The perlite had been expanded from very finely ground perlite ore and subsequently air classified and hand screened to a filler material having a loose bulk density less than 0.75 $kg/m^3$ with all particles passing 297 micrometers.

An aliquot of 1 kg of the expanded perlite and 2 kg of a 1% water diluted emulsion of polydimethyl siloxane (G.E. SM-2138) were charged to a stirred autoclave, the agitator being set at 10 revolutions per minute. The autoclave was sealed and the steam valve set at 80 psig to provide a temperature of 156° C. The materials were stirred in the autoclave at over 149° C. for 20 minutes, discharged, and oven dried.

An aliquot of the treated material was placed in a small glass jar, and water was added to about one-half fill the jar. The jar was sealed and shaken to see if all of the coated particles remained readily separable from the water. Any cloudiness of the water indicates water penetration of interstices in the surface of the coated porous material and loss of its lightweight character. Microscopic examination of this expanded perlite before coating showed many broken fragments of the exfoliated multi-voided perlite structure with many cracked particles, partial shells and fissured platelet fragments. This sample showed clear water and complete separation, with all of the silicone coated perlite floating at the top of the water level. The water in the sample jar has remained clear for over 6 months. This material is eminently suitable for compounding in water latex type polymeric paint products where a shelf life of at least 6 months may be required.

For comparison, another aliquot of the expanded perlite was sprayed to apply about 1.0% solids of the siloxane emulsion at atmospheric pressure and a temperature of about 107° C., dried and a sample submitted to the jar test. The water was quite cloudy initially and has become more cloudy on periodic reshaking of the jar over a short storage interval.

EXAMPLE 2

In similar fashion to Example 1, calcium sulfate anhydrite, prepared by rapidly dehydrating ground gypsum of its water of crystallization at a temperature above 538° C. and classifying it to a mean particle size of about 1.5 micrometers, was pressure impregnated with steam carried polydimethyl siloxane as in Example 1 to apply a coating of about 1% siloxane solids. The coated material adsorbed less than 1% of water when immersed in water for 21 days. In comparison an uncoated sample contained about 58% combined water when immersed for 21 days.

EXAMPLE 3

In similar fashion to Example 1, calcium sulfate anhydrite, limestone calcium carbonate, or mica is pressure impregnated with steam carried stearic acid at a pressure of about 80 psia and steam temperature of 150° C. for 15 minutes. Superior water resistance is obtained.

What is claimed is:

1. A method for the production of a coated mineral filler material having a hydrophobic coating thereon which penetrates, fills and seals fissures and cracks in the surface of the filler and having special utility in enhancing the properties of filled polymeric compositions containing such coated filler which comprises the steps of:
   (a) introducing porous mineral filler and about 0.01 to about 5.0% by weight based on the weight of mineral filler of a hydrophobic coating material into an agitated pressure vessel;
   (b) mixing the filler and coating material under low intensity agitation at a temperature between about 32° C. and about 275° C. and introducing steam pressure between about 10 psig and about 100 psig for at least about 1 minute;
   (c) and drying the wet coated filler to recover a hydrophobic coated mineral filler having enhanced water resistance.

2. The method of claim 1 in which in step (a) the coating material is selected from the group consisting of long chain aliphatic and dicarboxylic fatty acids having from about 12 to about 24 carbon atoms and their water dispersible base salts, alkanes having from about 2 to 60 carbon atoms and polyalkylenes having molecular weights of from about 280 to 30,000, polyalkylene glycols having a molecular weight from about 700 through about 6000, and organo-functional silicones of the general formula $R_i$-$SiX_3$ wherein R is selected from the group consisting of alkoxy and acetoxy and X is selected from the group consisting of halogen, alkoxy and acetoxy.

3. The method of claim 1 in which in step (2) the coating material is introduced in an amount of about 1% by weight of the filler.

4. The method of claim 1 in which in step (b) steam pressure is introduced for about 1 through 30 minutes.

5. The method of claim 1 in which in step (a) the mineral filler is expanded perlite.

6. The method of claim 1 in which in step (a) the mineral filler is calcium sulfate anhydrite.

7. The method of claim 1 in which in step (a) the coating material is polydimethyl siloxane.

8. The method of claim 1 in which in step (a) the coating material is an aqueous dispersion of polydimethyl siloxane.

9. The method of claim 1 including the steps of
   (a) introducing expanded perlite particles and about 1-5% by weight of polydimethyl siloxane; and
   (b) mixing with a stirrer providing about 10 revolutions per minute, at a temperature of about 150° C., and at a steam pressure of about 80 psig for about 20 minutes.

10. The method of claim 1 in which in step (a) calcium sulfate anhydrite and about 1-5% by weight of polydimethyl siloxane are introduced into the pressure vessel.

11. The method of claim 1 in which in step (a) calcium sulfate anhydrite and about 1-5% by weight of stearic acid are introduced into the pressure vessel.

12. The method of claim 1 in which in step (b) the filler and coating material are mixed with a stirrer providing about 5 to about 30 revolutions per minute.

13. A calcium sulfate filler material having enhanced water resistance and having a hydrophobic coating thereon penetrating, filling and sealing tissues, cracks, and interstices in the surface of the calcium sulfate, said coating comprising the dried solids steam carried and pressure impregnated onto the calcium sulfate by mixing the calcium sulfate and about 0.01% to about 5.0% by weight of hydrophobic coating material under low intensity agitation at a temperature between about 32°–275° C. and steam pressure between about 10–100 psig for at least about 1 minute and drying the wet coated calcium sulfate.

14. The filler of claim 13 in which the coating material comprises polydimethyl siloxane.

* * * * *